United States Patent [19]

Bertin

[11] 4,102,538
[45] Jul. 25, 1978

[54] LIP SEALING RING FOR A SHAFT

[75] Inventor: Jacques Bertin, Asnieres, France

[73] Assignee: Paulstra, Levallois-Perret, France

[21] Appl. No.: 622,227

[22] Filed: Oct. 14, 1975

[30] Foreign Application Priority Data

Oct. 21, 1974 [FR] France .............................. 74 35321

[51] Int. Cl.² ........................................... F16J 15/32
[52] U.S. Cl. ..................................... 277/153; 277/134
[58] Field of Search ............... 277/138, 153, 152, 164, 277/165, 235 R, 134, 180, 182

[56] References Cited

U.S. PATENT DOCUMENTS

| 2,482,029 | 9/1949 | Reynolds | 277/152 |
| 3,455,564 | 7/1969 | Dega | 277/180 |
| 3,929,340 | 12/1975 | Peisker | 277/134 |
| 3,930,655 | 1/1976 | Fern | 277/134 |
| 3,973,779 | 8/1976 | Burgmann | 277/25 |

FOREIGN PATENT DOCUMENTS 11,476  3/1956  Fed. Rep. of Germany ....... 277/182

Primary Examiner—Robert I. Smith
Attorney, Agent, or Firm—Larson, Taylor and Hinds

[57] ABSTRACT

A lip sealing ring has a lip engaging a shaft, the lip being at one end of a flexible sleeve which surrounds the shaft and is supported by its other end in a housing. The sealing lip is supported by a pair of stiffening rings, one on the inside and one on the outside of the sleeve, to ensure adequate sealing while allowing the sleeve to be sufficiently flexible to accommodate displacements of the shaft.

9 Claims, 7 Drawing Figures

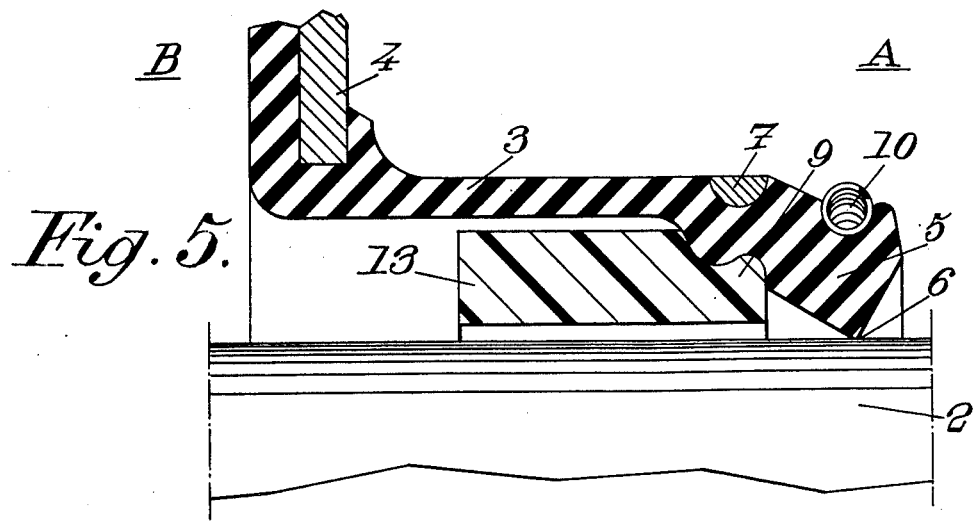
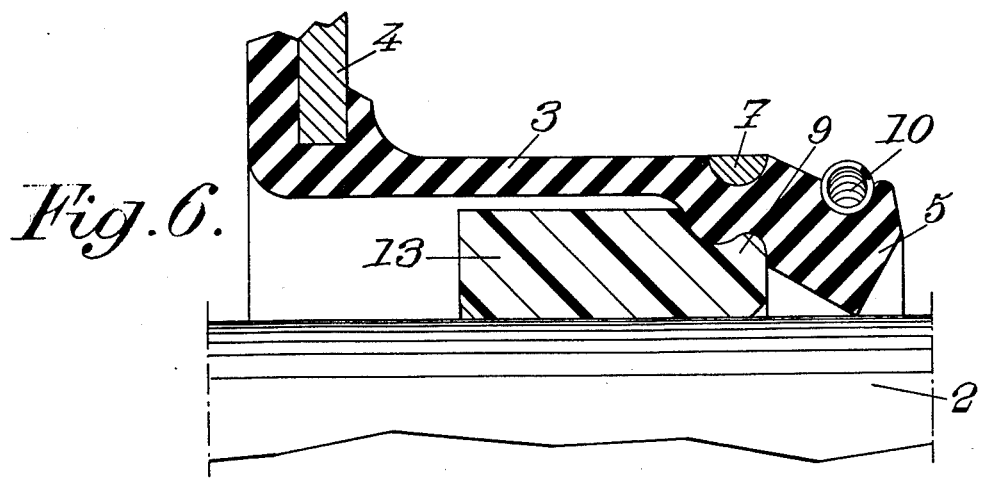
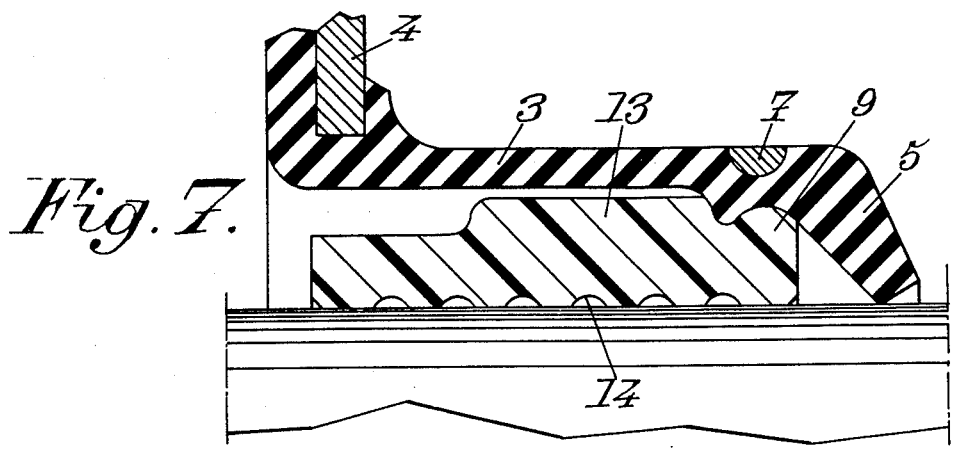

LIP SEALING RING FOR A SHAFT

The present invention relates to lip sealing rings for shafts which are mounted within a housing through which the shaft passes and have a lip engaging the shaft to form a seal. Relative motion between the shaft and the housing may be rotary or reciprocating and may also include displacements transverse to the axis of the shaft.

Commonly, such rings are formed integrally from an elastomeric material and comprise a holding part which is mounted in the housing and may be stiffened by a metal insert, a flexible sleeve which is connected at one end to the holding part and which loosely surrounds the shaft, and a lip portion at the other end of the sleeve.

Even in the case where a compression spring is provided around the sleeve in the proximity of the lip, the contact pressure is, to a large extent, limited owing to the necessary flexibility of the sleeve; in the most common applications this flexibility has to be fairly large to allow the relative radial displacements of the shaft with respect to its housing, that is in particular when there is a degree of eccentricity between the axes of the shaft and of the housing.

In addition, the annular rigidity must be fairly high at the lip so that the joint can remain effective when the shaft departs from circular form or when radial vibrations are produced.

Classical joints of this type thus include, in order to allow relative radial displacements, sleeves of considerable length and of small thickness. In such joints the lip, because of its one-piece construction with the flexible sleeve, cannot have the degree of annular and bending rigidity necessary to achieve good sealing contact with the shaft in all possible cases.

In order to correct this disadvantage it has already been proposed to include in such joints; in the region of the junction of the lip and the sleeve a rigid ring which, being of one-piece construction with the joint, has as its object the provision of a rigid supporting base for the lip; the presence of such a supporting base makes it possible to construct joints in which the contact lip, even when of low mass, possesses the desired annular and bending rigidity.

But in known embodiments of this arrangement the stiffening ring is single and is provided either on the exterior or on the interior of the sleeve; in either case the elastic mass which forms the seat of the ring is pushed back by said ring and, since it is not retained by a rigid support on the opposite side tends to detach itself from said ring; thus, in order to avoid the risk of separation of the ring, it is necessary to attach it to its seat by an adhesive process or the like.

Such processes of attachment are not easy to achieve in practice.

In addition the adhesion produced frequently exhibits little resistance to ageing and/or to contact with the fluid media with which the ring and its seat come into contact.

The object of the invention, among other things, is to remove this disadvantage.

In consists principally in the provision of two stiffening rings in the zone of the junction between the sleeve and the lip, one on the exterior and the other on the interior, the location of these two rings being such that after assembly of the joint they are opposite to each other and thus automatically compress between themselves the annular mass of elastic material which constitutes their respective seats.

In these conditions mounting of each ring can be carried out simply by introducing it into a complementary groove moulded in the corresponding surface (internal or external) of the zone of the junction concerned, without any attachment by adhesives being necessary.

In a particular embodiment the internal ring is constituted by an external rib on a collar mounted in the interior of the sleeve along at least part of the axial length of said sleeve some play being left between the external surface of the collar and the sleeve. The collar may be mounted with play on to the shaft or, on the other hand, it may be fitted on to the shaft.

Another arrangement consists in giving the element constituting the lip a fluted form in such a way that the bead or surface of contact of said lip with the shaft is undulating in form thus producing an increase in area of the surface of contact swept out on the shaft, and thus reducing the localisation of heating due to friction; such a device can be embodied by mounting at least one stiffening ring the diameter and/or the form of which are designed in such a way that when mounted they cause the lip to be drawn back and formed into flutes.

In addition to these principal devices the invention includes certain other devices which are preferably employed at the same time and which will be described in more detail below.

Several preferred embodiments of the invention will be described in the following with reference to the accompanying drawings in a manner which is, of course, non-limiting.

In these drawings

FIGS. 2 to 7 are partial axial sections through joints constructed in accordance with other modes of embodiment of the invention.

Figure 1:
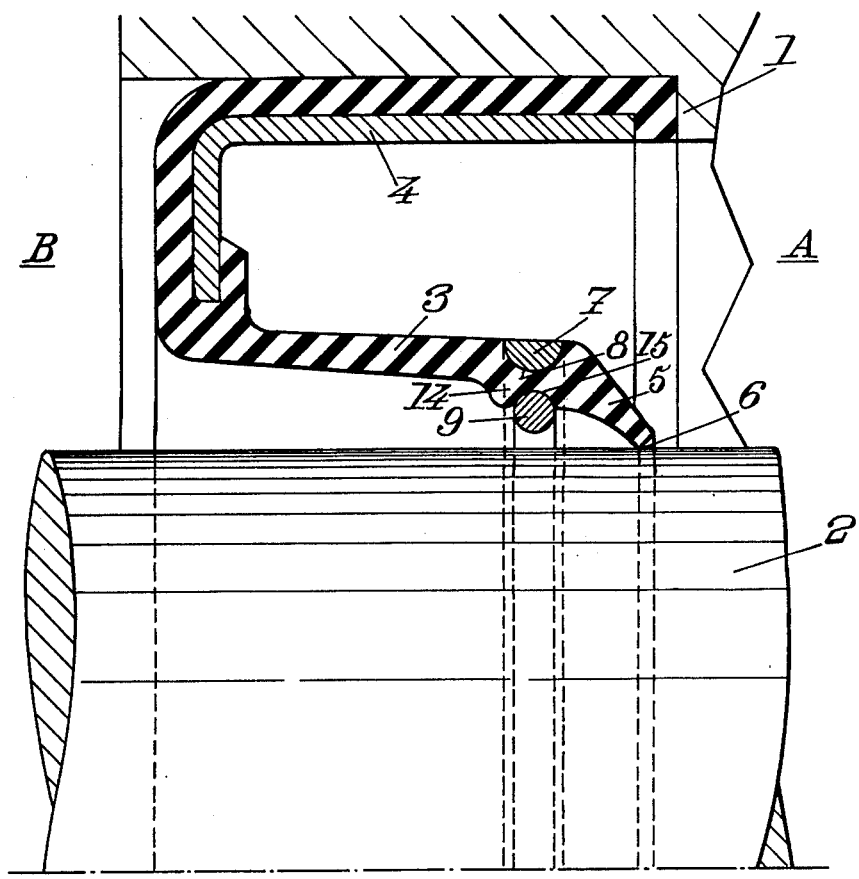
FIG. 1 shows in an axial half-section an assembly including a rotating shaft in the interior of a housing with an interposed joint, said joint being constructed in accordance with the invention.

The joint under consideration is intended to be interposed between a housing provided within a machine part 1 of any type and a shaft 2 suitably supported by pillow blocks (not illustrated).

Essentially this joint includes, as is usual, a sleeve 3 made from an elastomer and of conical or cylindrical-conical form or the like, suitbale to surround said shaft, this sleeve being of one-piece construction with a framework 4 in such a way that it can be fixed within the interior of a recess in the part 1 (or in any other way) and extended at one extremity by at least a rim forming a lip 5, this lip being intended to make contact with the shaft 2 by means of a contact bead 6 under a suitable elastic pressure.

This elastic pressure is for example produced by suitable choice of the diameter of the contact bead 6 before mounting in relation to the diameter of the shaft so that when the latter is mounted stretching of the bead is produced; the pressure may also be produced by the action of an annular spring (such as is illustrated in FIGS. 5 to 7, described below). In any event this contact pressure depends in each case on the natural elasticity of the body of the sleeve 3. But, in general, it will be necessary to make this sleeve relatively flexible so as to allow for the relative axial displacements of the shaft in relation to the housing, which displacements arise from the various causes already dicussed above.

Thus this flexibility affects the behaviour of the lip 5, decreasing its double rigidity, annular and against bending, in such a way that the tightness of the seal between the two environments A and B separated by the joint is influenced unfavourably.

In accordance with the invention there are mounted in the zone within which the lip 5 is attached to the sleeve a first external stiffening ring 7 and a second internal stiffening ring 9.

The respective locations of these two rings 7 and 9 are such that each of them acts as a support for the other with the interposition of a neck 14, forming part of the sleeve and compressed between these two rings, as a consequence there is no longer any risk of separation of the sleeve from the rings since the pressure of each ring on the elastic neck 14 is absorbed by the pressure in the opposite direction applied to the neck by the other ring.

It is thus unnecessary to provide special means of attachment to anchor the rings on to the sleeve; it suffices to insert them by force into two grooves 8 and 15, on the exterior and interior respectively, produced during moulding of the sleeve.

In order to increase the flexibility of the joint, the internal diameter of the interior joint 9 is arranged to remain greater than the diameter of that zone of the shaft 2 which lies opposite to it, thus making it possible for the junction zone strengthened by the two joints to undergo transverse displacements relative to the shaft.

The rings are made from metal or also from strengthened or unstrengthened plastic material.

Because of said rings it is possible at one and the same time to:

construct a very flexible sleeve, that is a long sleeve of small thickness, to accomodate the relative radial displacements described above, and to produce, nevertheless, a rigid zone at the base of the conical section which forms the lip 5 is such a way that said lip, even when of small mass, provides high annular and bending rigidity, ensuring a good seal even when the sleeve-lip assembly is driven in rotation and thus subjected to a certain degree of centrifugal force.

If it is desired to increase the pressure of the lip on the shaft, it is of course possible to use an annular helicoidal spring 10 in addition as in normal practice (FIGS. 5 to 7).

The lip 5, instead of having a substantially rectilinear appearance in axial half-section, may have a curvilinear profile particularly on the shaft side, in particular with its concavity facing the shaft.

Figure 2:
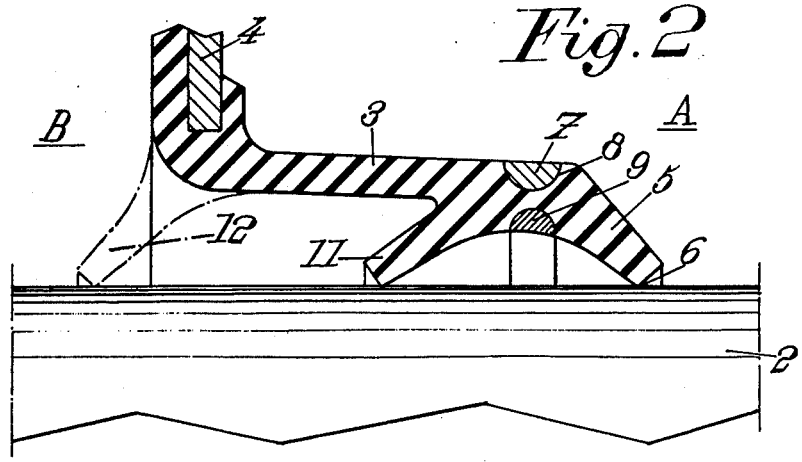

The tight seal between the two enclosures A and B, which may be filled with two fluids (air, water, oil, etc., according to the application) at different pressures, may be further completed, in addition to the action of the lip 5, by other means, for example:

a second lip 11 combined with the lip 5, as illustrated in FIG. 2, which said lip opposes the introduction of the liquid B, the two lips 6 and 11 forming an annular channel at the base of which the ring 9 is mounted.

and/or another supplementary lip 12 (shown in dotted lines in FIG. 2) which opposes the introduction of various pollutants.

Figure 3:
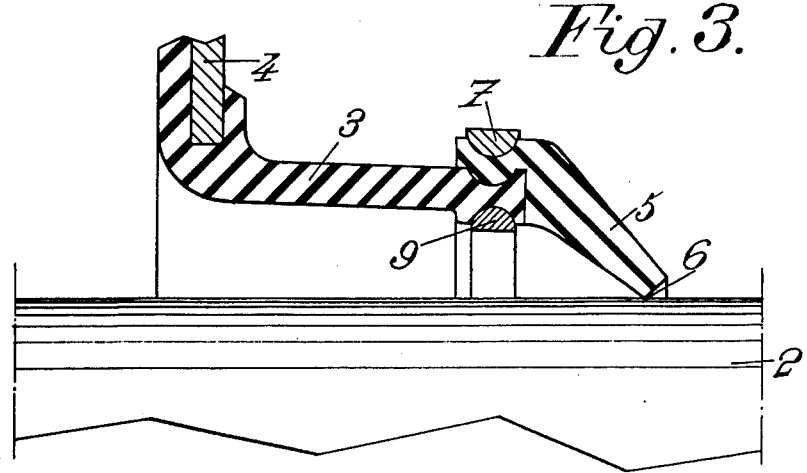

It is also possible to consider manufacturing at least one of the said lips, in particular the lip 5, from an elastomer different from that used for the sleeve, as illustrated in FIG. 3, the attachment between lip and sleeve being brought about in any suitable way, for example by groove and rib, as illustrated, the joint being subsequently held in place by the mutual pressure of the two rings 7 and 9.

Figure 4:
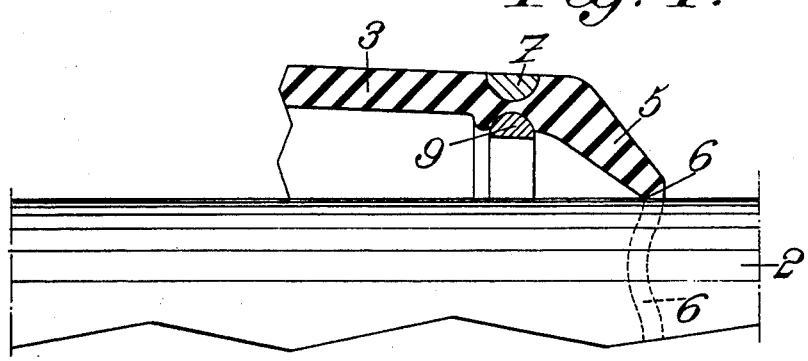

In this connection it may be of interest to arrange that the lip 5 should have, at least in part, a fluted form so that its contact edge 6 has the undulating form illustrated in FIG. 4. The surface area swept out in FIG. 1 is thus enlarged axially which reduces the localisation of the heat due to friction. This may easily be achieved by giving a sufficiently small diameter to the stiffening ring 7 so that when it is engaged in its working position it exerts an internal radial pressure on the lip causing the formation of flutes as desired.

The said ring 7, and if necessary the ring 9 may possibly have an undulating or channelled form favouring the formation of flutes and thus ensuring that the contact edge 6 has the desired undulating form.

According to another embodiment illustrated in FIGS. 5 to 7 the holding ring 9 may be of one-piece construction with a supporting collar 13 mounted within the internal space of the sleeve 3 and, where necessary, serving to support the latter, particularly in the case in which the pressure in B is markedly greater than the pressure in A (for example a pressure of the order of 8 to 10 bars or more), which may occur in numerous applications, particularly in hydraulic pumps.

It is to be understood that the supporting collar 13 may be mounted freely around the shaft 2, as assumed in FIG. 5, or, on the other hand, it may be fitted on to said shaft as assumed in FIG. 6.

In this latter case the precise adjustment between the guiding collar and the shaft 2 also guarantees a tight seal even when relatively large radial displacements are produced between the shaft and the seat of the joint 3,4.

The collar 13 also acts as a barrier to the entry of various pollutants.

It has been assumed in FIG. 7 that the collar 13 includes within its internal bore a helicoidal or other groove 14 which can also offer resistance to the flow of one of the fluids A or B.

It is to be understood that the joints described above may be employed in normal conditions with the stiffening rings 7 and 9 removed when the latter are mounted so as to be dismountable.

As a result, whatever the mode of embodiment adopted, there are produced joints which offer numerous advantages relative to those of the type in question which are already in use, in particular:

that of great ease of manufacture and long life, each joint being fitted with its two rings without special tools, by simple insertion, whereas the rings, once mounted, have no tendency to separate from the sleeve, that of ensuring a good seal even when more or less pronounced relative radial movements of the staff in relation to its housing are present, that of being capable of resisting relatively high pressure differences.

As is obvious and also as has already been indicated, the invention is not limited to any degree to those modes of application and embodiment which have been more particularly envisaged; on the contrary it includes all variants of the same.

I claim:

1. In a shaft sealing joint comprising a sleeve of elastomeric material freely surrounding said shaft, having at one end a lip suitable for elastic contact with the shaft and being at the other end integral with a support, the improvement which comprises providing around said sleeve in the portion of said sleeve that joins the lip, an external rigid annular stiffening ring gripping around said sleeve on the external side of said portion and an internal rigid, annular stiffening ring, gripping around said sleeve on the internal side of said portion, said external rigid annular stiffening ring and said internal rigid annular stiffening ring being located opposite each other on substantially the same longitudinal axis in said portion so as to compress between them said sleeve of elastomeric material and form a neck in said portion.

2. In a shaft sealing joint in claim 1 the further improvement which comprises a first groove and a second groove moulded in the external and internal surfaces of said sleeve, respectively, said external and internal stiffening rings being disposed in said first and second grooves, respectively.

3. In a shaft sealing joint as in claim 2, the improvement wherein the rigid internal annular element is integral with a collar surrounding the shaft and leaving a free space between its outer surface and the elastic sleeve.

4. A joint as claimed in claim 3 in which the internal ring is integral with a collar which is mounted with play on the shaft.

5. In a shaft sealing joint as in claim 1 the improvement wherein the sleeve and the lip are two different pieces joined to each other by said annular elements.

6. A joint as claimed in claim 5 wherein said sleeve comprises a lip part and a carrying part, said parts being held together by said stiffening rings.

7. A joint as claimed in claim 6 wherein said parts have an interlocking annular rib and groove formation.

8. A joint as claimed in claim 1 in which the sleeve has two lips and said stiffening rings are disposed axially between said lips.

9. A joint as claimed in claim 1 in which the lip has a fluted form providing an undulating line of contact with the shaft, said fluted form being produced and maintained by pressure on the sealing lip between the shaft and the stiffening rings.

* * * * *